United States Patent
Fujii

(10) Patent No.: US 10,186,149 B2
(45) Date of Patent: Jan. 22, 2019

(54) DRIVING ASSISTANCE DEVICE

(71) Applicant: TOYOTA JIDOSHA KABUSHIKI KAISHA, Toyota-shi, Aichi-ken (JP)

(72) Inventor: Yohei Fujii, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/708,739

(22) Filed: Sep. 19, 2017

(65) Prior Publication Data

US 2018/0082583 A1 Mar. 22, 2018

(30) Foreign Application Priority Data

Sep. 21, 2016 (JP) .................................. 2016-184422

(51) Int. Cl.
*G08G 1/0967* (2006.01)
*H04W 84/00* (2009.01)

(52) U.S. Cl.
CPC ....... *G08G 1/0967* (2013.01); *G08G 1/09675* (2013.01); *G08G 1/096716* (2013.01); *G08G 1/096783* (2013.01); *H04W 84/00* (2013.01)

(58) Field of Classification Search
CPC .... G08G 1/096; G08G 1/0962; G08G 1/0967; G08G 1/096716; G08G 1/09675; G08G 1/096783; H04W 84/00; B60W 30/09; B60W 10/18; B60W 10/04; B60W 40/04
See application file for complete search history.

(56) References Cited

U.S. PATENT DOCUMENTS

| | | | | |
|---|---|---|---|---|
| 8,892,342 B2* | 11/2014 | Yamada | ........... | G08G 1/096716 340/929 |
| 9,607,514 B2* | 3/2017 | Morimoto | .............. | G08G 1/096 |
| 9,865,165 B2* | 1/2018 | Moritani | .......... | G08G 1/096783 |
| 9,956,955 B2* | 5/2018 | Oguri | ........................ | B60T 7/18 |
| 2011/0093178 A1* | 4/2011 | Yamada | ........... | G08G 1/096716 701/70 |
| 2011/0115646 A1* | 5/2011 | Matsumura | ...... | G08G 1/096716 340/907 |
| 2011/0133956 A1* | 6/2011 | Yamada | .................. | G01C 21/26 340/929 |
| 2013/0110315 A1* | 5/2013 | Ogawa | ............. | G08G 1/096716 701/1 |
| 2013/0110316 A1* | 5/2013 | Ogawa | ............. | G08G 1/096716 701/1 |

(Continued)

FOREIGN PATENT DOCUMENTS

JP 4968383 B2 7/2012

*Primary Examiner* — An T Nguyen
(74) *Attorney, Agent, or Firm* — Hunton Andrews Kurth LLP

(57) ABSTRACT

A driving assistance device includes a controller configured to perform presentation of driving assistance information regarding a signalized intersection to a driver of a vehicle by causing a display unit to display an assistance image. The controller is configured to, when a road distance up to a signalized intersection where the driver of the vehicle is scheduled to enter is less than a threshold distance, prohibit the presentation of the driving assistance information to the driver, the presentation being performed by displaying the assistance image including an image indicating information regarding a predicted light color of a traffic signal installed at the corresponding signalized intersection.

7 Claims, 7 Drawing Sheets

(56) References Cited

U.S. PATENT DOCUMENTS

2016/0075330 A1\* 3/2016 Oguri ................. B60T 7/18
 701/70
2016/0148508 A1\* 5/2016 Morimoto ............ G08G 1/096
 701/117
2017/0154528 A1\* 6/2017 Moritani .......... G08G 1/096783

\* cited by examiner

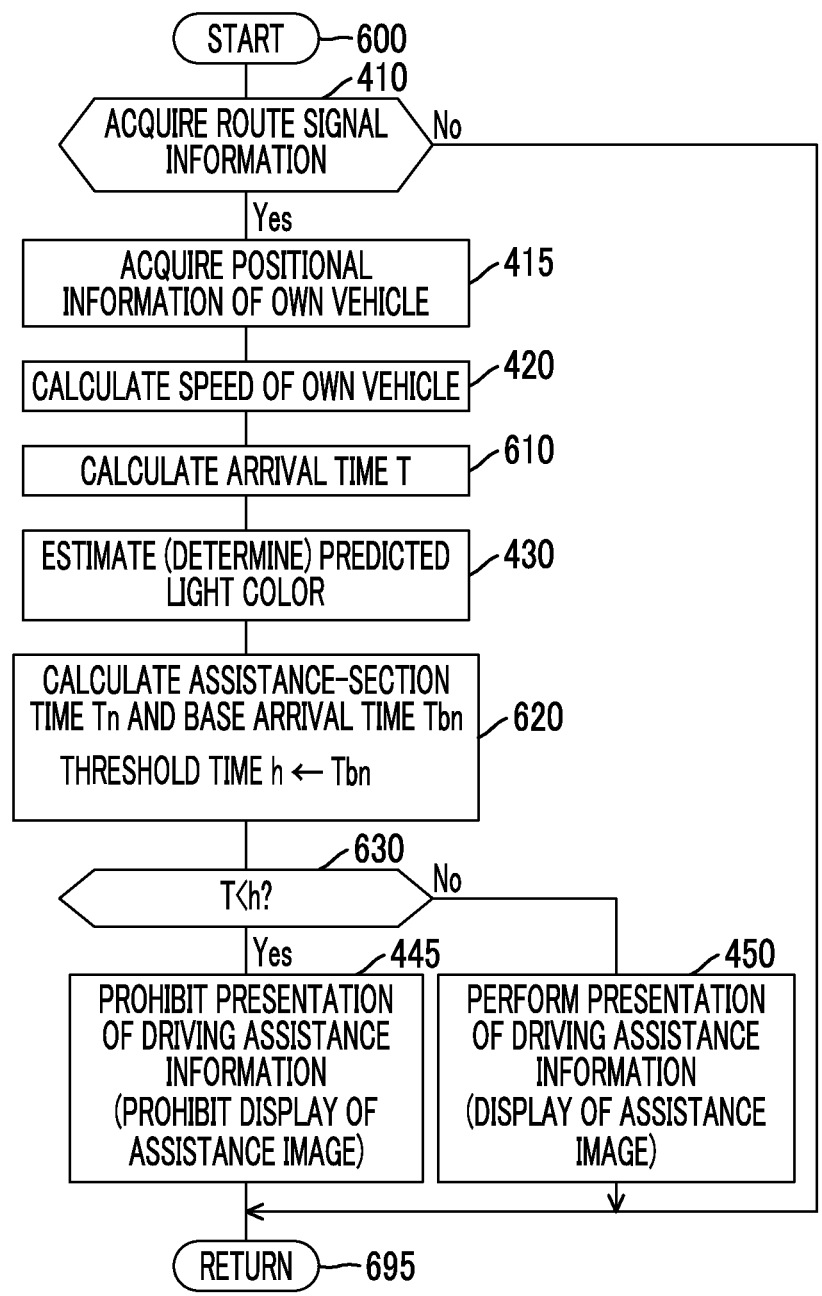

DRIVING ASSISTANCE DEVICE

INCORPORATION BY REFERENCE

The disclosure of Japanese Patent Application No. 2016-184422 filed on Sep. 21, 2016 including the specification, drawings and abstract is incorporated herein by reference in its entirety.

BACKGROUND

1. Technical Field

The disclosure relates to a driving assistance device that presents driving assistance information to a driver as necessary by utilizing route signal information.

2. Description of Related Art

Driving assistance devices have actively been developed which assist a driver in driving a vehicle by displaying appropriate information for the driver, based on route signal information supplied from a roadside infrastructure (advanced optical beacon) or the like.

One of the driving assistance devices known in the related art (hereinafter, referred to as "related-art device") predicts the color of light (hereinafter, referred to as "light color") of a traffic signal at the time when a vehicle enters the signalized intersection ahead. The related-art device causes a display to display information regarding the light color that is predicted (hereinafter, referred to as "predicted light color") of the traffic signal so as to perform driving assistance by presenting the corresponding information to the driver (refer to Japanese Patent No. 4968383).

In the driving assistance provided by the related-art device, the driver is caused to check the information regarding the predicted light color displayed on the display before the vehicle enters the signalized intersection so as to realize the predicted light color of the traffic signal at the time when the vehicle is entering the signalized intersection, and thereby it is possible to avoid unnecessary acceleration and deceleration of the vehicle.

SUMMARY

In the related-art device, the driver becomes accustomed to the driving assistance, and trusts the information regarding the predicted light color presented by the related-art device, and thereby the driver uses the information as the traffic signal, in some cases. For example, when the information regarding the predicted light color presented by the related-art device suggests a "green", a driving situation in which the driver checks only the information regarding the predicted light color, does not visually check the light color of the actual traffic signal and the vehicle enters the signalized intersection by accelerating the vehicle may occur. In addition, when the information regarding the predicted light color presented by the related-art device suggests a "red", a driving situation in which the driver checks only the information regarding the predicted light color, does not visually check the light color of the actual traffic signal, and decelerates the vehicle before the vehicle enters the signalized intersection may occur.

However, the information regarding the predicted light color presented by the related-art device may not be accurate due to the disturbance of situation changes such as a traffic flow. Accordingly, in a case where the information regarding the predicted light color is not accurate, when such a driving situation occurs, unnecessary and inappropriate acceleration or deceleration may be performed immediately before the signalized intersection, and as a result, the vehicle may not smoothly pass the signalized intersection.

The present disclosure provides a driving assistance device which is possible to urge a driver to visually check a light color of a traffic signal installed at a signalized intersection before the driver of a vehicle enters the corresponding signalized intersection, and thus to cause the vehicle to smoothly pass the signalized intersection.

According to an aspect of the disclosure, there is provided a driving assistance device including a wireless communication unit, a display unit, and a controller. The wireless communication unit is configured to acquire route signal information, through wireless communication, from a roadside communicator that is installed on a road on which a vehicle travels, the route signal information including a position of one signalized intersection or positions of a plurality of signalized intersections present in front of the vehicle in a traveling direction, a color of light of a traffic signal installed at the signalized intersection, and the seconds remaining until the color of the light changes. The display unit is configured to display an assistance image including an image indicating information regarding a predicted light color of the nearest signalized intersection ahead where the vehicle is scheduled to enter, the predicted light color being a color of light of the traffic signal that is predicted as a color when the vehicle is entering the signalized intersection, by using vehicle information including the position of the vehicle and a vehicle speed of the vehicle, and the route signal information. The controller is configured to estimate the predicted light color and to perform presentation of driving assistance information regarding the nearest signalized intersection ahead to a driver of the vehicle by causing the display unit to display the assistance image. In a case where the vehicle is traveling in an assistance section that is a presentation target of the driving assistance information regarding the nearest signalized intersection ahead, toward the nearest signalized intersection ahead, the controller performs presentation of the driving assistance information when the vehicle is traveling in a first section that is a section from a point where the route signal information is acquired or from a signalized intersection passing point, to a predetermined point positioned before the nearest signalized intersection ahead by a predetermined distance, and prohibits the presentation of the driving assistance information when the vehicle is traveling in a second section that is a section from at least the predetermined point to an entrance of the nearest signalized intersection ahead.

With this, in a case where the vehicle is traveling in the assistance section that is the presentation target of the driving assistance information regarding the nearest signalized intersection ahead where the vehicle is scheduled to enter, toward the corresponding signalized intersection, when the vehicle is traveling in at least the second section, the display of the assistance image including the image indicating the information regarding the predicted light color of the traffic signal installed at the corresponding signalized intersection (that is, the presentation of the driving assistance information to the driver) is not performed. Accordingly, it is possible to urge a driver to visually check a light color of a traffic signal installed at a signalized intersection before the driver of a vehicle enters the corresponding signalized intersection, and thus to cause the vehicle to smoothly pass the corresponding signalized intersection.

According to the aspect of the disclosure, the controller may be configured to calculate a road distance from a current point of the vehicle to the nearest signalized intersection ahead by using the vehicle information and the route signal information, the controller may be configured to determine whether the road distance is less than a threshold distance that is equal to the predetermined distance, the controller may be configured to determine that the vehicle is traveling in the first section when the road distance is equal to or longer than the threshold distance, and to perform the presentation of the driving assistance information, and the controller may be configured to determine that the vehicle is traveling in the second section when the road distance is shorter than the threshold distance, and to prohibit the presentation of the driving assistance information.

With this, in a case where the road distance from the current point of the vehicle to the nearest signalized intersection ahead where the vehicle is scheduled to enter is less than the threshold distance that is equal to the predetermined distance, the display of the assistance image including the image indicating the information regarding the predicted light color of the traffic signal installed at the corresponding signalized intersection (that is, the presentation of the driving assistance information to the driver) is not performed. Accordingly, it is possible to urge a driver to visually check a light color of a traffic signal installed at a signalized intersection before the driver of a vehicle enters the corresponding signalized intersection, and thus to cause the vehicle to smoothly pass the corresponding signalized intersection.

According to the aspect of the disclosure, the controller may be configured to, when the nearest signalized intersection ahead is the first signalized intersection from the point where the route signal information is acquired, calculate a distance of a section from the point where the route signal information is acquired to the nearest signalized intersection ahead, as a distance of the assistance section, the controller may be configured to, when the nearest signalized intersection ahead is a second or subsequent signalized intersection from the point where the route signal information is acquired, calculate a distance of a section from the signalized intersection that is adjacent to the nearest signalized intersection ahead and is in a direction opposite to a traveling direction of the vehicle, to the nearest signalized intersection ahead, as a distance of the assistance section, and the controller may be configured to determine the threshold distance such that the threshold distance corresponding to the assistance section is increased continuously or stepwise as the calculated distance of the assistance section is increased.

For example, after the vehicle passes the signalized intersection, as a distance of a section up to the nearest signalized intersection ahead where the vehicle is scheduled to enter next becomes longer, since a state in which the driver receives the driving assistance by the presentation of the driving assistance information is prolonged, the driver may further become accustomed to the driving assistance. Thus, in this case, it is desirable to urge a driver to visually check a light color of a traffic signal at an earlier timing so that the driver is caused to be conscious of visually checking the light color of the traffic signal.

With this, the threshold distance in such a case is set to be increased continuously or stepwise as the distance of the assistance section is increased. Accordingly, even when the distance of the assistance section varies, the presentation of driving assistance information to the driver is stopped at an appropriate timing. As a result, it is possible to cause the driver to be conscious of visually checking the light color of the traffic signal at an appropriate timing.

According to the aspect of the disclosure, the controller may be configured to calculate a road distance from a current point of the vehicle to the nearest signalized intersection ahead by using the vehicle information and the route signal information and calculate an arrival time by dividing the road distance by a correlated vehicle speed that is correlated to the vehicle speed of the vehicle, the controller may be configured to determine whether the arrival time is shorter than a threshold time that is a time obtained by dividing the predetermined distance by the correlated vehicle speed, the controller may be configured to determine that the vehicle is traveling in the first section when the arrival time is equal to or longer than the threshold time, and to perform the presentation of the driving assistance information, and the controller may be configured to determine that the vehicle is traveling in the second section when the arrival time is shorter than the threshold time, and to prohibit the presentation of the driving assistance information.

With this, in a case where the arrival time T calculated by dividing the road distance up to the nearest signalized intersection ahead where the vehicle is scheduled to enter by the correlated vehicle speed is shorter than the threshold time that is the time obtained by dividing the predetermined distance by the correlated vehicle speed, the display of the assistance image including the image indicating the information regarding the predicted light color of the traffic signal installed at the corresponding signalized intersection (that is, the presentation of the driving assistance information to the driver) is not performed. Accordingly, it is possible to urge a driver to visually check a light color of a traffic signal installed at a signalized intersection before the driver of a vehicle enters the corresponding signalized intersection, and thus to cause the vehicle to smoothly pass the signalized intersection.

According to the aspect of the disclosure, the controller may be configured to, when the nearest signalized intersection ahead is the first signalized intersection from the point where the route signal information is acquired, calculate a distance of a section from the point where the route signal information is acquired to the nearest signalized intersection ahead, as a distance of the assistance section and calculate a time to be taken when the vehicle travels in the assistance section at the correlated vehicle speed by dividing the calculated distance by the correlated vehicle speed, the controller may be configured to, when the nearest signalized intersection ahead is a second or subsequent signalized intersection from the point where the route signal information is acquired, calculate a distance of a section from a signalized intersection that is adjacent to the nearest signalized intersection ahead and is in a direction opposite to a traveling direction of the vehicle, to the nearest signalized intersection ahead, as a distance of the assistance section, and calculate a time to be taken when the vehicle travels in the assistance section at the correlated vehicle speed by dividing the calculated distance by the correlated vehicle speed, and the controller may be configured to determine the threshold time such that the threshold time corresponding to the assistance section is increased continuously or stepwise as the calculated time to be taken of the assistance section is increased.

For example, after the vehicle passes the signalized intersection, as a time to be taken when the vehicle travels in a section up to the nearest signalized intersection ahead where the vehicle is scheduled to enter next becomes longer, since a state in which the driver receives the driving assistance by the presentation of the driving assistance information is prolonged, the driver may further become accustomed to the driving assistance. Thus, in this case, it is desirable to urge a driver to visually check a light color of a traffic signal at an earlier timing so that the driver is caused to be conscious of visually checking the light color of the traffic signal.

With this, the threshold time in such a case is set to be increased continuously or stepwise as the time to be taken is increased. Accordingly, even when the time to be taken varies, the presentation of driving assistance information to the driver is stopped at an appropriate timing. As a result, it is possible to cause the driver to be conscious of visually checking the light color of the traffic signal at an appropriate timing.

According to the aspect of the disclosure, the controller may be configured to, when the presentation of the driving assistance information is prohibited, cause the display unit to display an image in which the predicted light color cannot be recognized by the driver.

In this case, before the driver of the vehicle enters the signalized intersection, the driver cannot recognize the predicted light color by the image displayed on the display unit. Accordingly, before the driver of the vehicle enters the signalized intersection, it is possible to urge the driver to visually check the light color of the traffic signal installed at the corresponding signalized intersection.

According to the aspect of the disclosure, the controller may be configured to change a state in which the presentation of the driving assistance information is prohibited to a state in which the presentation of the driving assistance information is performed, when a predetermined time elapses or when the vehicle travels by the predetermined distance after the vehicle has arrived at the entrance of the nearest signalized intersection.

For example, in a case where the state in which the presentation of the driving assistance information is prohibited is changed to a state in which the presentation of the driving assistance information is performed, immediately after the vehicle arrives at the entrance of the signalized intersection, the driving assistance information that is not necessary for the driver may be presented immediately after the vehicle passes the entrance of the signalized intersection. Accordingly, in this case, it is desirable not to perform the presentation of the driving assistance information until the vehicle passes at least the central point of the signalized intersection.

With this, the state in which the presentation of the driving assistance information is prohibited is changed to the state in which the presentation of the driving assistance information is performed when a predetermined time elapses or when the vehicle travels by a predetermined distance after the vehicle has arrived at the entrance of the nearest signalized intersection. As a result, it is possible to change the state in which the presentation of the driving assistance information is prohibited to the state in which the presentation of the driving assistance information is performed at an appropriate timing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart illustrating a routine executed by a CPU of a driving assistance ECU;

DETAILED DESCRIPTION OF EMBODIMENTS

Figure 1:
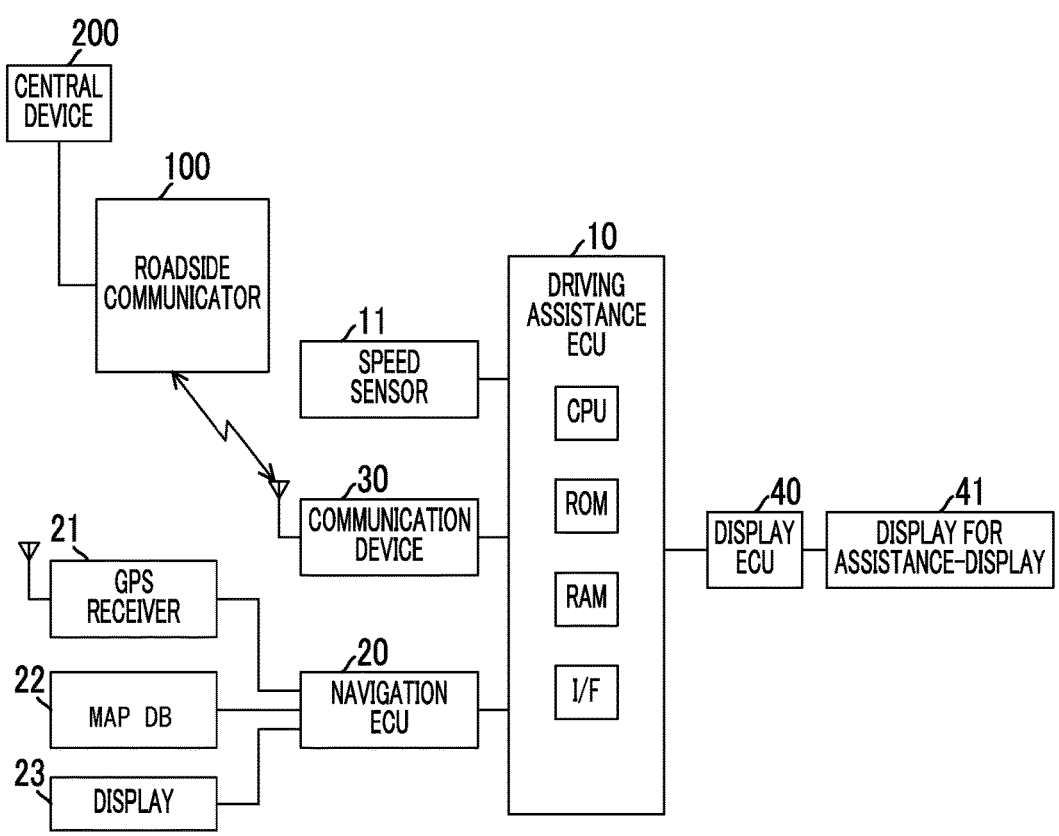
FIG. 1 is a schematic configuration diagram illustrating a driving assistance device according to a first embodiment of the disclosure.

Hereinafter, driving assistance devices according to embodiments of the disclosure will be described with reference to the drawings. The same reference numerals are assigned to the same or corresponding parts in all the drawings of the embodiments.

First Embodiment

A driving assistance device according to the first embodiment of the disclosure (hereinafter, may be referred to as a "first driving assistance device") will be described.

Configuration

The first driving assistance device is applied to a vehicle (hereinafter, may be referred to as an "own vehicle" for being distinguished from other vehicles).

As illustrated in FIG. 1, the first driving assistance device includes a driving assistance ECU 10, a navigation ECU 20, a communication device 30, a display ECU 40, and a display for assistance-display 41.

The ECU is an Electric Control Unit including a microcomputer as a main component, the ECUs are connected to each other through a Controller Area Network (CAN) (not illustrated) so as to transmit and receive information. In the specification, the microcomputer includes a CPU, a read-only memory (ROM), a random-access memory (RAM), a nonvolatile memory, an interface I/F, and the like. The CPU implements various functions by executing instructions (programs or routines) stored in the ROM. Some or all the ECUs may be integrated in one ECU.

The driving assistance ECU 10 is connected to a speed sensor 11 and various sensors (not illustrated) so as to receive detection signals or output signals of the sensors. The sensors may be connected to any ECU (an engine ECU, a steering ECU, or the like) (not illustrated) other than the driving assistance ECU 10. In this case, the driving assistance ECU 10 receives the detection signals and the output signals of the sensors from the ECU to which the sensors are connected, through the CAN.

The speed sensor 11 detects a traveling speed (vehicle speed SPD) of the own vehicle, and outputs a signal indicating the vehicle speed SPD.

The navigation ECU 20 is connected to a GPS receiver 21 that receives a GPS signal for detecting the current position of the own vehicle, a map database 22 in which cartographic information and the like are stored, a touch panel display 23 as a human machine interface, and the like.

The navigation ECU 20 specifies the position of the own vehicle (that is, acquires positional information of the own vehicle) at the current time point, based on the GPS signal. The navigation ECU 20 performs various arithmetic processes, based on the position of the own vehicle, and the cartographic information stored in the map database 22, and guides the pathway using the display 23. The cartographic information stored in the map database 22 includes road information.

The communication device 30 is a wireless communication terminal (a wireless communication unit) used for the connection to an external network system. In addition, the communication device 30 can perform wireless communication with a roadside communicator 100 that is installed on the road. The wireless communication includes both the optical wireless communication and wireless communication using radio waves.

The roadside communicator 100 is configured to communicate with a central device 200. Specifically, the roadside communicator 100 is an optical beacon or a radio beacon. The central device 200 manages the route signal information of a plurality of signalized intersections, and other kinds of information. Specifically, the central device 200 is a traffic control center.

The roadside communicator 100 is configured to acquire, from the central device 200, road traffic information that includes route signal information or the like of a predetermined section (hereinafter, referred to as an "information provision section") including a location where the roadside communicator 100 is disposed, and to transmit the acquired road traffic information to a vehicle. The route signal information includes intersection positional information (the central position of the intersection (the position may be used for estimating the position of the stop line) or information indicating the position of the stop line, or both the central position of the intersection and the information indicating the position of the stop line), and signal control information (light color, the seconds remaining until the light color changes, and the like).

The display ECU 40 creates a display content (display image), based on (according to) the instruction of the driving assistance ECU 10 and causes the display for assistance-display 41 to display the content. As the display for assistance-display 41, a multifunction display, a head-up display, or the like can be adopted. Instead of the display for assistance-display 41, the display 23 for navigation may be adopted.

Overview of Operation

Next, the overview of operations performed by the first driving assistance device will be described with reference to FIGS. 2A and 2B.

Assistance Section R1

Figure 2A:
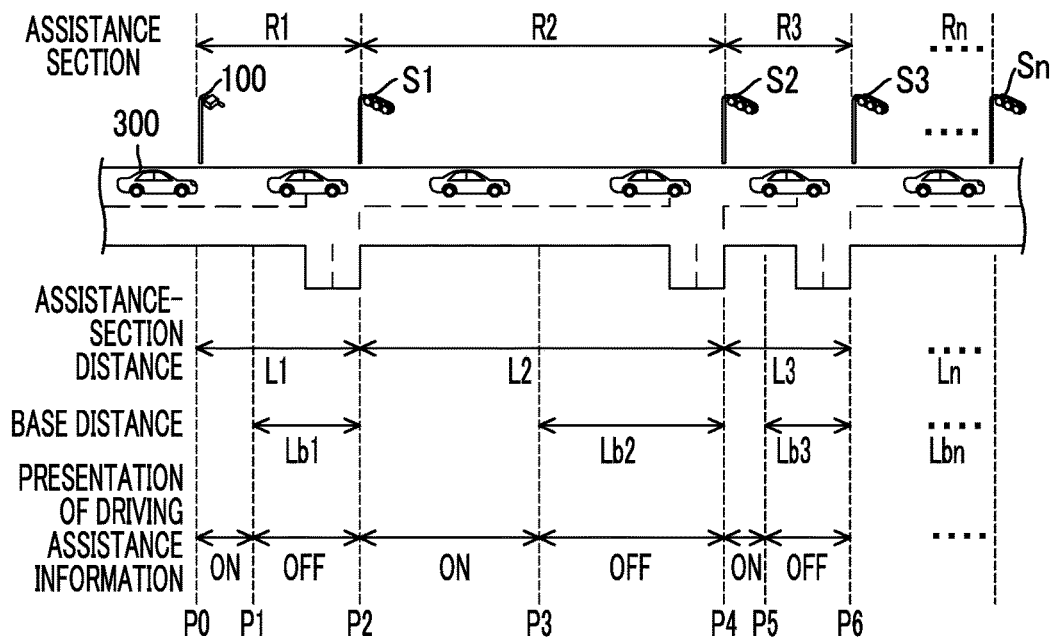
FIG. 2A is a schematic diagram illustrating the overview of operations of the driving assistance device according to the first embodiment of the disclosure.

As illustrated in FIG. 2A, when a vehicle 300 traveling on the road is traveling at a point P0 positioned within an area where communication with the roadside communicator 100 is possible, the driving assistance ECU 10 performs road-vehicle communication with the roadside communicator 100 using the communication device 30.

Accordingly, the driving assistance ECU 10 acquires route signal information of a plurality of signalized intersections (intersection positional information, light colors of traffic signals S1 to Sn installed at the intersections, the seconds remaining until each of the light colors changes, and the like) that is in front of the vehicle 300 in a traveling direction and is included in the information provision section of the roadside communicator 100.

When the driving assistance ECU 10 acquires the route signal information, the driving assistance ECU 10 estimates or determines the predicted light color (predicted light color) of each of the traffic signals S1 to Sn of the time when the vehicle 300 is entering each signalized intersection, by using the acquired route signal information and own vehicle information (vehicle speed of the vehicle 300 and positional information of the vehicle 300).

The driving assistance ECU 10 determines a display image (hereinafter, referred to as an "assistance image") that corresponds to the predicted light color that is estimated or determined, and is displayed on the display for assistance-display 41. The assistance image includes at least an image indicating information regarding the determined predicted light color. The assistance image may be an image including other images such as an image indicating "a recommended speed of the time when the vehicle is passing the signalized intersection", in addition to the image indicating information regarding the predicted light color.

Figure 3A:
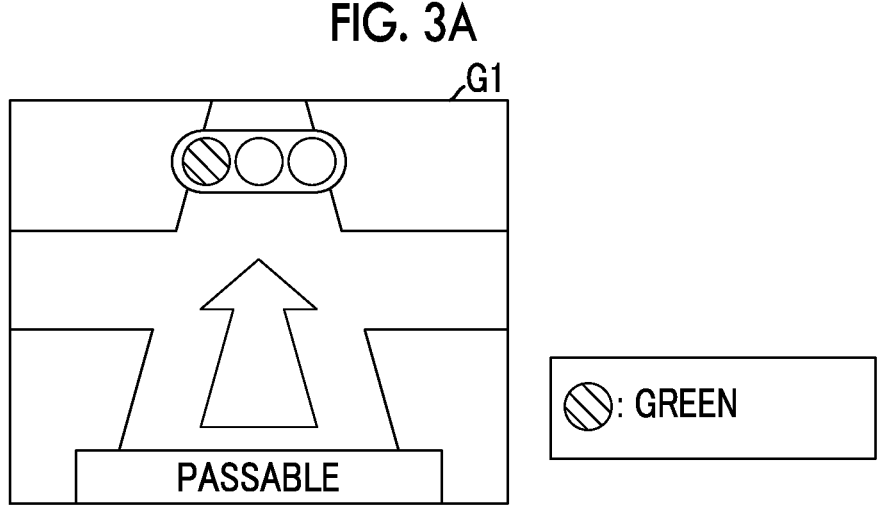
FIG. 3A is a schematic diagram illustrating an example of a display image.
Figure 3B:
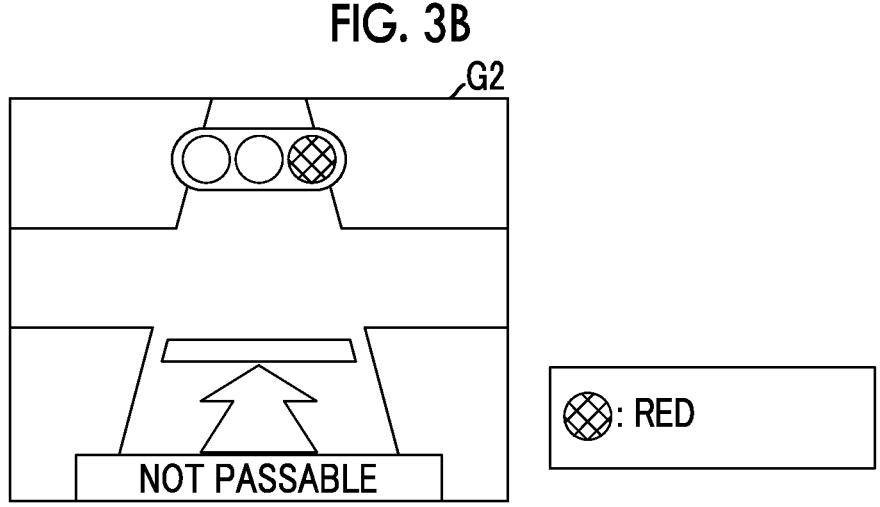
FIG. 3B is a schematic diagram illustrating an example of a display image.

Specifically, when the predicted light color is a "green", the driving assistance ECU 10 determines, as an assistance image corresponding to the green, an image G1 including "an image indicating that the light color of the traffic signal is a green (a picture of a traffic signal with the light color being a green)" and a message "passable" as character information as illustrated in FIG. 3A. When the "predicted light color" is a "red", the driving assistance ECU 10 determines, as an assistance image corresponding to the red, an image G2 including "an image indicating that the light color of the traffic signal is a red (a picture of a traffic signal with the light color being a red)" and a message "not passable" as character information as illustrated in FIG. 3B.

In addition, the driving assistance ECU 10 calculates a distance (hereinafter, referred to as "assistance-section distance") Ln of a section Rn (hereinafter, referred to as an "assistance section Rn") that is a presentation target of driving assistance information regarding an n-th signalized intersection from the point where the vehicle 300 has acquired the route signal information.

The assistance section Rn indicates, in the case of n=1, a section from a route signal information acquisition point (P0) to a signalized intersection passing point (P2) that is the first signalized intersection passing point from the route signal information acquisition point (P0). In the first embodiment, the signalized intersection passing point represents the position of the stop line on the exit side of the signalized intersection in the traveling direction of the vehicle 300. The assistance section Rn indicates, in the case of n≥2, "a section from (an n-1-th signalized intersection passing point from the route signal information acquisition point (P0)) to (an n-the signalized intersection passing point from the route signal information acquisition point (P0))". For example, the assistance section Rn (R3) indicates, in the case of n=3, "a section from (the second signalized intersection passing point (P4) from the route signal information acquisition point (P0)) to (the third signalized intersection passing point (P6) from the route signal information acquisition point (P0))".

In addition, the driving assistance ECU 10 determines a base distance Lbn, based on the assistance-section distance Ln. As indicated by line a in FIG. 2B, the driving assistance ECU 10 determines the base distance Lbn such that the base distance Lbn is increased continuously or stepwise as the assistance-section distance Ln is increased.

Figure 2B:
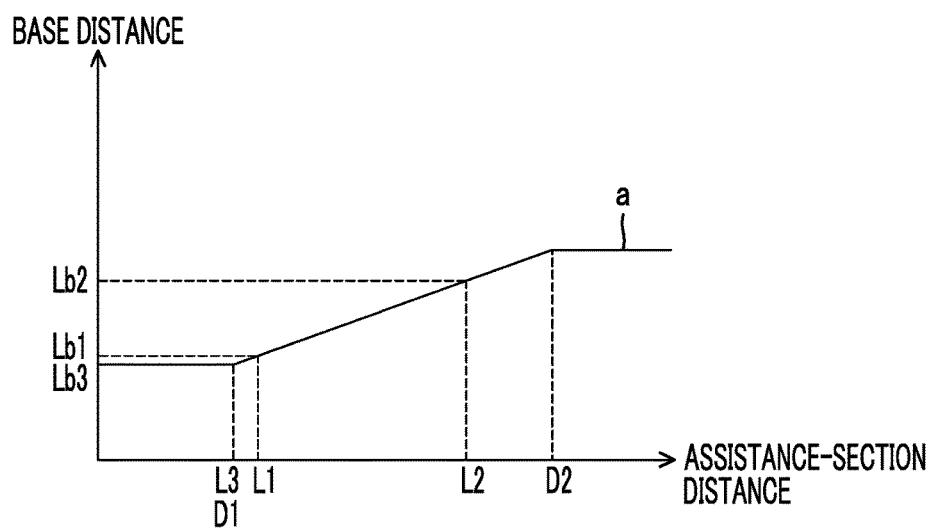
FIG. 2B is a graph illustrating a relationship between an assistance-section distance and a base distance.

Specifically, the magnitude relationship of the assistance-section distance Ln and the base distance Lbn illustrated in FIG. 2B is as follows. In a case where the assistance-section distance Ln is equal to or shorter than a first predetermined value D1, even when the assistance-section distance Ln is increased, the base distance Lbn is constant. The base distance Lbn when the assistance-section distance Ln is equal to or shorter than the first predetermined value D1 is set to be sufficiently longer than a distance from the entrance position to the exit position of the general signalized intersection. In a case where the assistance-section distance Ln is longer than the first predetermined value D1 and is smaller than a second predetermined value D2 that is greater than the first predetermined value D1, the base distance Lbn is continuously increased as the assistance-section distance Ln is increased. In a case where the assistance-section distance Ln is equal to or longer than the second predetermined value D2, even when the assistance-section distance Ln is increased, the base distance Lbn is constant. As the typical first predetermined value D1 and the base distance Lbn in this case, the first predetermined value D1 is 100 m, and the base distance Lbn is 50 m. Specifically, as the typical second predetermined value D2 and the base distance Lbn in this case, the second predetermined value D2 is 300 m, and the base distance Lbn is 150 m.

The driving assistance ECU 10 uses the base distance Lbn as a threshold for determining whether the presentation of the driving assistance information to the driver is to be performed.

In a case where the vehicle 300 is traveling in the assistance section R1 (in the case of n=1), the driving assistance ECU 10 calculates an assistance-section distance L1. In addition, the driving assistance ECU 10 determines a base distance Lb1, based on the relationship illustrated in FIG. 2B and the assistance-section distance L1.

After the point P0, the driving assistance ECU 10 calculates a "road distance D" that is a distance from the position of the vehicle 300 at the current time point to the nearest signalized intersection passing point ahead (in this case, a point P2), based on the own vehicle information and the intersection positional information. In addition, the driving assistance ECU 10 repeatedly determines whether to perform the presentation of the driving assistance information, by using the calculated road distance D and the base distance Lb1 that is determined based on the assistance-section distance L1.

In a case where the vehicle 300 is traveling in a section from the point P0 to the point P2 (the assistance section R1), the driving assistance ECU 10 repeatedly determines whether the road distance D is shorter than the base distance Lb1 so as to determine whether the driving assistance ECU 10 is to perform the presentation of the driving assistance information. That is, the base distance Lb1 is used as a threshold for determining whether the presentation of the driving assistance information is to be performed.

In the example illustrated in FIG. 2A, in a case where the vehicle 300 is traveling in a section from the point P0 to a point P1, the road distance D is equal to or longer than the base distance Lb1. Accordingly, the driving assistance ECU 10 determines that the driving assistance ECU 10 is to perform the presentation of the driving assistance information. In a case where the driving assistance ECU 10 determines that the driving assistance ECU 10 is to perform the presentation of the driving assistance information, the display ECU 40 causes the display for assistance-display 41 to display an assistance image (for example, the image G1 illustrated in FIG. 3A or the image G2 illustrated in FIG. 3B) according to the predicted light color, the assistance image being created according to an instruction of the driving assistance ECU 10.

Figure 3C:
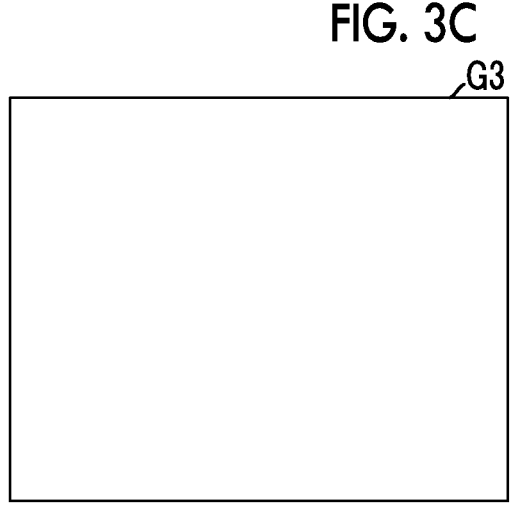
FIG. 3C is a schematic diagram illustrating an example of a display image.

In the example illustrated in FIG. 2A, in a case where the vehicle 300 is traveling in a section from a point immediately after the point P1 to the point P2, the road distance D is shorter than the base distance Lb1. Accordingly, the driving assistance ECU 10 determines that the driving assistance ECU 10 is to prohibit the presentation of the driving assistance information. In a case where the driving assistance ECU 10 determines that the driving assistance ECU 10 is to prohibit the presentation of the driving assistance information, the display ECU 40 causes the display for assistance-display 41 to display an image (for example, a non-image illustrated in FIG. 3C) which is created according to an instruction of the driving assistance ECU 10 and in which the predicted light color cannot be recognized by the driver.

As a result, when the vehicle 300 is traveling in the assistance section R1 toward the nearest signalized intersection ahead, the presentation of the driving assistance information is to be performed or is to be prohibited as follows. That is, when the vehicle 300 is traveling in a first section that is a section from the route signal information acquisition point (P0) to a predetermined point (P1) positioned before the signalized intersection passing point (P2) by a predetermined distance (the base distance Lb1), the presentation of the driving assistance information is performed (that is, an assistance image (the image G1 or the image G2) according to the predicted light color is displayed on the display for assistance-display 41).

When the vehicle 300 is traveling at a point immediately after the predetermined point (P1), the presentation of the driving assistance information is prohibited, and the display image on the display for assistance-display 41 is changed from the assistance image (the image G1 or the image G2) according to the predicted light color that has been displayed until the point P1, to an image (an image G3) in which the predicted light color cannot be recognized. Then, when the vehicle 300 is traveling in a second section that is a section from at least the predetermined point (P1) to the entrance of the corresponding signalized intersection, the presentation of the driving assistance information is prohibited (that is, an image (the image G3) in which the predicted light color cannot be recognized is displayed on the display for assistance-display 41).

Assistance Section R2

In a case where the vehicle 300 is traveling in an assistance section R2 after passing through the point P2 (in the case of n=2), the driving assistance ECU 10 calculates an assistance-section distance L2. In addition, the driving assistance ECU 10 determines a base distance Lb2, based on the relationship illustrated in FIG. 2B and the assistance-section distance L2.

When the vehicle 300 is traveling in a section from a point immediately after the point P2 to a point P4 (the assistance section R2), the driving assistance ECU 10 calculates the road distance D that is a distance from the position of the vehicle 300 at the current time point to the nearest signalized intersection passing point ahead (in this case, the point P4). In addition, the driving assistance ECU 10 determines whether the calculated road distance D is equal to or longer than the base distance Lb2 that is determined based on the assistance-section distance L2 so as to repeatedly determine whether the driving assistance ECU 10 is to perform the presentation of the driving assistance information.

In the example illustrated in FIG. 2A, in a case where the vehicle 300 is traveling in a section from a point immediately after the point P2 to a point P3, the road distance D is equal to or longer than the base distance Lb2. Accordingly, the driving assistance ECU 10 determines that the driving assistance ECU 10 is to perform the presentation of the driving assistance information. In a case where the driving assistance ECU 10 determines that the driving assistance ECU 10 is to perform the presentation of the driving assistance information, the display ECU 40 causes the display for assistance-display 41 to display an assistance image (for example, the image G1 illustrated in FIG. 3A or the image G2 illustrated in FIG. 3B) according to the predicted light color, the assistance image being created according to an instruction of the driving assistance ECU 10.

In the example illustrated in FIG. 2A, in a case where the vehicle 300 is traveling in a section from a point immediately after the point P3 to the point P4, the road distance D is shorter than the base distance Lb2. Accordingly, the driving assistance ECU 10 determines that the driving assistance ECU 10 is to prohibit the presentation of the driving assistance information. In a case where the driving assistance ECU 10 determines that the driving assistance ECU 10 is to prohibit the presentation of the driving assistance information, the display ECU 40 causes the display for assistance-display 41 to display an image (for example, the non-image G3 illustrated in FIG. 3C) which is created according to an instruction of the driving assistance ECU 10 and in which the predicted light color cannot be recognized by the driver.

As a result, when the vehicle 300 is traveling in the assistance section R2 toward the nearest signalized intersection ahead, the presentation of the driving assistance information is to be performed or is to be prohibited as follows. When the vehicle 300 is traveling at a point immediately after the point P2, the presentation of the driving assistance information is performed, and the display image on the display for assistance-display 41 is changed from the image (the image G3) which has been displayed until the point P2 and in which the predicted light color cannot be recognized, to an assistance image (the image G1 or the image G2) according to the predicted light color.

When the vehicle 300 is traveling in the first section that is a section from a point immediately after the signalized intersection passing point (P2) to a predetermined point (P3) positioned before the signalized intersection passing point (P4) by a predetermined distance (the base distance Lb2), the presentation of the driving assistance information is performed (that is, an assistance image (the image G1 or the image G2) according to the predicted light color is displayed on the display for assistance-display 41).

When the vehicle 300 is traveling at a point immediately after the predetermined point (P3), the presentation of the driving assistance information is prohibited, and the display image on the display for assistance-display 41 is changed from the assistance image (the image G1 or the image G2) according to the predicted light color that has been displayed until the point P3, to an image (the image G3) in which the predicted light color cannot be recognized. Then, when the vehicle 300 is traveling in the second section that is a section from at least the predetermined point (P3) to the entrance of the corresponding signalized intersection, the presentation of the driving assistance information is prohibited (that is, an image (the image G3) in which the predicted light color cannot be recognized is displayed on the display for assistance-display 41).

Assistance Section R3

In a case where the vehicle 300 is traveling in an assistance section R3 after passing through the point P4 (in the case of n=3), the driving assistance ECU 10 calculates an assistance-section distance L3. In addition, the driving assistance ECU 10 determines a base distance Lb3, based on the relationship illustrated in FIG. 2B and the assistance-section distance L3.

When the vehicle 300 is traveling in a section from a point immediately after the point P4 to a point P6 (the assistance section R3), the driving assistance ECU 10 calculates the road distance D that is a distance from the position of the vehicle 300 at the current time point to the nearest signalized intersection passing point ahead (in this case, the point P6). In addition, the driving assistance ECU 10 determines whether the calculated road distance D is equal to or longer than the base distance Lb3 that is determined based on the calculated assistance-section distance L3 so as to repeatedly determine whether the driving assistance ECU 10 is to perform the presentation of the driving assistance information.

In the example illustrated in FIG. 2A, in a case where the vehicle 300 is traveling in a section from a point immediately after the point P4 to a point P5, the road distance D is equal to or longer than the base distance Lb3. Accordingly, the driving assistance ECU 10 determines that the driving assistance ECU 10 is to perform the presentation of the driving assistance information. In a case where the driving assistance ECU 10 determines that the driving assistance ECU 10 is to perform the presentation of the driving assistance information, the display ECU 40 causes the display for assistance-display 41 to display an assistance image (for example, the image G1 illustrated in FIG. 3A or the image G2 illustrated in FIG. 3B) according to the predicted light color, the assistance image being created according to an instruction of the driving assistance ECU 10.

In the example illustrated in FIG. 2A, in a case where the vehicle 300 is traveling in a section from a point immediately after the point P5 to the point P6, the road distance D is shorter than the base distance Lb3. Accordingly, the driving assistance ECU 10 determines that the driving assistance ECU 10 is to prohibit the presentation of the driving assistance information. In a case where the driving assistance ECU 10 determines that the driving assistance ECU 10 is to prohibit the presentation of the driving assistance information, the display ECU 40 causes the display for assistance-display 41 to display the image (for example, the non-image G3 illustrated in FIG. 3C) which is created according to an instruction of the driving assistance ECU 10 and in which the predicted light color cannot be recognized by the driver.

As a result, when the vehicle 300 is traveling in the assistance section R3 toward the nearest signalized intersection ahead, the presentation of the driving assistance information is to be performed or is to be prohibited as follows. When the vehicle 300 is traveling at a point immediately after the point P4, the presentation of the driving assistance information is performed, and the display image on the display for assistance-display 41 is changed from the image (the image G3) which has been displayed until the point P4 and in which the predicted light color cannot be recognized, to an assistance image (the image G1 or the image G2) according to the predicted light color.

When the vehicle 300 is traveling in the first section that is a section from a point immediately after the signalized intersection passing point (P4) to a predetermined point (P5) positioned before the signalized intersection passing point (P6) by a predetermined distance (the base distance Lb3), the presentation of the driving assistance information is performed (that is, an assistance image (the image G1 or the image G2) according to the predicted light color is displayed on the display for assistance-display 41).

When the vehicle 300 is traveling at a point immediately after the predetermined point (P5), the presentation of the driving assistance information is prohibited, and the display image on the display for assistance-display 41 is changed from the assistance image (the image G1 or the image G2) according to the predicted light color that has been displayed until the point P5, to an image (the image G3) in which the predicted light color cannot be recognized. Then, when the vehicle 300 is traveling in the second section that is a section from at least the predetermined point (P5) to the entrance of the corresponding signalized intersection, the presentation of the driving assistance information is prohibited (that is, an image (the image G3) in which the predicted light color cannot be recognized is displayed on the display for assistance-display 41).

Specific Operation

Next, the specific operation of the first driving assistance device will be described. Whenever a predetermined time elapses, the CPU of the driving assistance ECU 10 (which may simply be referred to as the "CPU") is configured to execute the routine illustrated in the flowchart in FIG. 4.

The CPU starts the process from step 400 to proceed to step 410 at a predetermined timing, and determines whether the CPU acquires route signal information (route signal information of a plurality of signalized intersections included in the information provision section) from the roadside communicator 100.

When the CPU does not acquire the route signal information, the CPU determines "No" in step 410, and proceeds to step 495 to temporarily finish the routine.

In contrast, when the CPU acquires the route signal information, the CPU determines "Yes" in step 410, sequentially executes the processes of step 415 to step 435 described below, and proceeds to step 440. In step 415, the CPU acquires the positional information of the own vehicle 300 from the navigation ECU 20. In step 420, the CPU calculates the vehicle speed of the own vehicle 300 using a signal from the speed sensor 11. In step 425, the CPU calculates a distance (the road distance D) from the position of the own vehicle 300 included in the positional information of the own vehicle 300 to the nearest signalized intersection passing point ahead. In step 430, the CPU estimates light colors of the traffic signals Si to Sn that are the first traffic signal to n-th traffic signal from the own vehicle 300 (that is, determines the predicted light color), and determines an assistance image according to the predicted light color of the nearest signalized intersection ahead from the position of the own vehicle, among n signalized intersections. In step 435, the CPU calculates the assistance-section distance Ln, determines the base distance Lbn, based on the assistance-section distance Ln, and sets the determined base distance Lbn as a threshold distance a.

Next, the CPU proceeds to step 440 and determines whether the road distance D is shorter than the threshold distance a. When the road distance D is equal to or longer than the threshold distance a, the CPU determines "No" in step 440 (that is, determines that the presentation of the driving assistance information is to be performed), proceeds to step 450, and transmits an instruction to the display ECU 40 so that the presentation of the driving assistance information (that is, display of "the assistance image corresponding to the predicted light color of the nearest signalized intersection ahead" determined in step 430) is performed. Then, the CPU proceeds to step 495 to temporarily finish the routine.

In contrast, when the road distance D is shorter than the threshold distance a, the CPU determines "Yes" in step 440, proceeds to step 445, and prohibits the presentation of the driving assistance information. Then, the CPU proceeds to step 495 to temporarily finish the routine.

As described above, with the first driving assistance device, actions and effects described below can be obtained. That is, when the road distance D until the vehicle 300 arrives at the signalized intersection passing point of the nearest signalized intersection ahead is shorter than the threshold distance a (the base distance Lbn), the display of the assistance image including an image indicating the information regarding the predicted light color of the traffic signal installed at the corresponding signalized intersection (that is, the presentation of driving assistance information to the driver) is not performed.

As a result, in a case where the vehicle 300 is traveling in the assistance section Rn that is the presentation target of the driving assistance information regarding the corresponding signalized intersection, toward the corresponding signalized intersection, in the second section that is a section from at least a point positioned before the corresponding signalized intersection by a predetermined distance to the entrance of the corresponding signalized intersection, the display of the assistance image including an image indicating the information regarding the predicted light color of the traffic signal installed at the corresponding signalized intersection (that is, the presentation of driving assistance information to the driver) is not performed.

Accordingly, before the driver of the vehicle 300 enters the nearest signalized intersection ahead, it is possible to urge the driver to visually check the light color of the traffic signal installed at the corresponding signalized intersection, and thus to cause the vehicle 300 to smoothly pass the signalized intersection.

The threshold distance a is determined to be increased continuously or stepwise as the assistance-section distance Ln that is the presentation target of the driving assistance information regarding the nearest signalized intersection ahead is increased (refer to FIG. 2B). Accordingly, even when the distance of the assistance section Rn varies, the presentation of the driving assistance information to the driver is stopped at an appropriate timing. As a result, it is possible to cause the driver to be conscious of visually checking the light color of the traffic signal at an appropriate timing.

Second Embodiment

Next, a driving assistance device according to the second embodiment of the disclosure (hereinafter, which may be referred to as a "second driving assistance device") will be described. The second driving assistance device is different from the first driving assistance device in that whether the presentation of driving assistance information is to be performed is determined by using "an assistance-section time Tn, a base arrival time Tbn, and an arrival time T" that are respectively used instead of "the assistance-section distance Ln, the base distance Lbn, and the road distance D". The assistance-section time Tn, the base arrival time Tbn, and the arrival time T will be described below. Specifically, the second driving assistance device is different from the first driving assistance device only in that the CPU of the driving assistance ECU 10 of the second driving assistance device executes a routine illustrated in FIG. 6 instead of the routine illustrated in FIG. 4. Hereinafter, the different points will mainly be described.

Overview of Operation

First, the overview of operations performed by the second driving assistance device will be described with reference to FIGS. 5A and 5B.

Assistance Section R1

The driving assistance ECU 10 calculates a time (hereinafter, referred to as "assistance-section time") Tn to be taken when the vehicle 300 travels in the section Rn (the assistance section Rn) at a correlated vehicle speed correlated to the vehicle speed of the own vehicle 300 (specifically, the vehicle speed v of the own vehicle 300 at the current time point), the section Rn being a presentation target of the driving assistance information regarding an n-th signalized intersection from the point where the vehicle 300 has acquired the route signal information. As the correlated vehicle speed, other correlated vehicle speeds such as the last average vehicle speed of the own vehicle 300, and average vehicle speeds of traffic may be used.

In addition, the driving assistance ECU 10 determines the base arrival time Tbn, based on the assistance-section time Tn. As illustrated by line h in FIG. 5B, the driving assistance ECU 10 determines the base arrival time Tbn such that the base arrival time Tbn is increased continuously or stepwise as the assistance-section time Tn is increased.

Figure 5A:
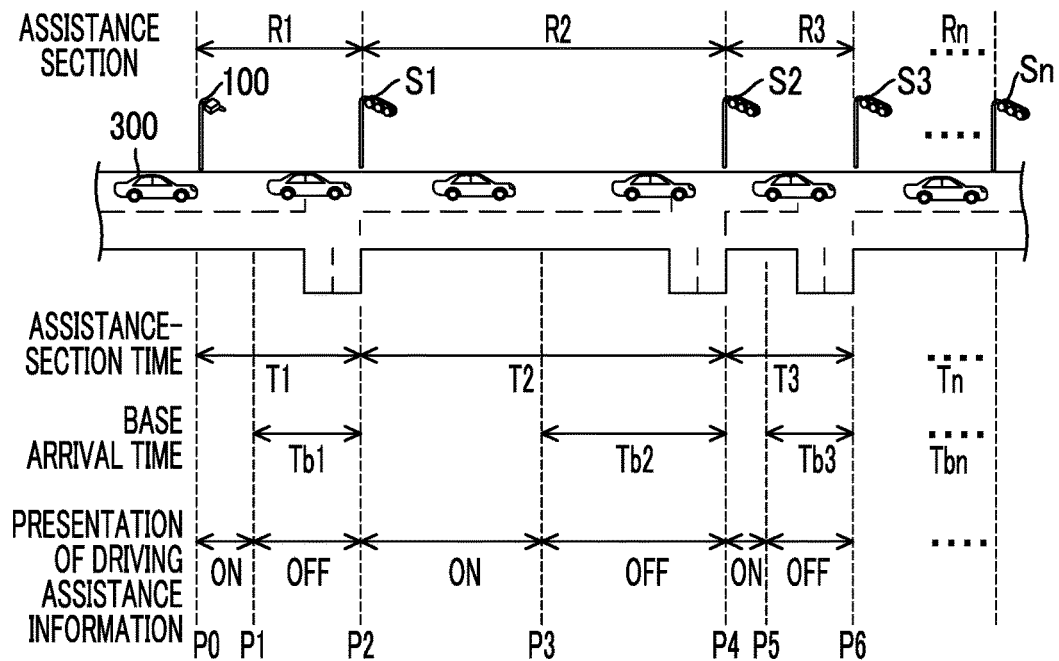
FIG. 5A is a schematic diagram illustrating the overview of operations of a driving assistance device according to a second embodiment of the disclosure.
Figure 5B:
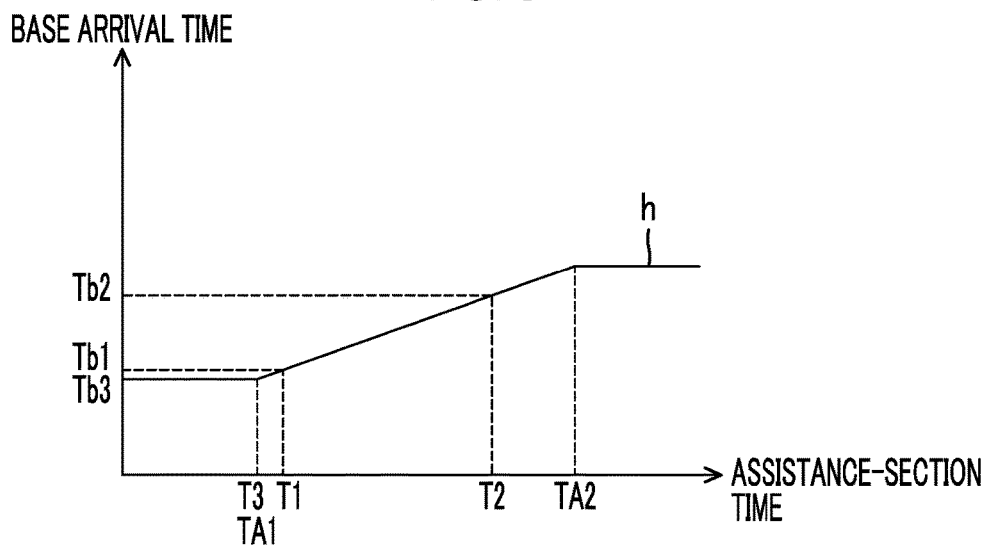
FIG. 5B is a graph illustrating a relationship between an assistance-section time and a base arrival time.

Specifically, the magnitude relationship of the assistance-section time Tn and the base arrival time Tbn illustrated in FIG. 5B is as follows. In a case where the assistance-section time Tn is equal to or shorter than a first predetermined time TA1, even when the assistance-section time Tn is increased, the base arrival time Tbn is constant. In a case where the assistance-section time Tn is longer than the first predetermined time TA1 and is shorter than a second predetermined time TA2 that is longer than the first predetermined time TA1, the base arrival time Tbn is continuously increased as the assistance-section time Tn is increased. In a case where the assistance-section time Tn is equal to or longer than the second predetermined time TA2, even when the assistance-section time Tn is increased, the base arrival time Tbn is constant.

The driving assistance ECU 10 uses the base arrival time Tbn as a threshold for determining whether the presentation of the driving assistance information to the driver is to be performed.

In a case where the vehicle 300 is traveling in the assistance section R1 (in the case of n=1), the driving assistance ECU 10 calculates an assistance-section time T1. Specifically, the driving assistance ECU 10 calculates the assistance-section distance L1, and divides the assistance-section distance L1 by the vehicle speed v (correlated vehicle speed) of the own vehicle at the current time point so as to calculate the assistance-section time T1 (the same is applied to an assistance-section time T2 and an assistance-section time T3 described below). In addition, the driving assistance ECU 10 determines a base arrival time Tb1, based on the relationship illustrated in FIG. 5B and the assistance-section time T1.

After the point P0, the driving assistance ECU 10 calculates the road distance D that is a distance from the position of the vehicle 300 at the current time point to the nearest signalized intersection passing point ahead (in this case, the point P2), based on the own vehicle information and the intersection positional information, and calculates, as the arrival time T, a time obtained by dividing the road distance D by the vehicle speed v (correlated vehicle speed) of the own vehicle at the current time point. That is, the arrival time T is the time to be taken when the vehicle 300 travels from the position of the vehicle 300 at the current time point to the nearest signalized intersection passing point ahead (in this case, the point P2) at the vehicle speed v of the own vehicle 300 at the current time point. The driving assistance ECU 10 determines whether to perform the presentation of the driving assistance information, by using the arrival time T and the base arrival time Tb1.

In a case where the vehicle 300 is traveling in a section from the point P0 to the point P2 (the assistance section R1), the driving assistance ECU 10 repeatedly determines whether the arrival time T is shorter than the base arrival time Tb1 so as to determine whether to perform the presentation of the driving assistance information. That is, the base arrival time Tb1 is used as a threshold for determining whether the presentation of the driving assistance information is to be performed.

In the example illustrated in FIG. 5A, in a case where the vehicle 300 is traveling in a section from the point P0 to the point P1, the arrival time T is equal to or longer than the base arrival time Tb1. Accordingly, the driving assistance ECU 10 determines that the driving assistance ECU 10 is to perform the presentation of the driving assistance information. In a case where the driving assistance ECU 10 determines that the driving assistance ECU 10 is to perform the presentation of the driving assistance information, the display ECU 40 causes the display for assistance-display 41 to display an assistance image (for example, the image G1 illustrated in FIG. 3A or the image G2 illustrated in FIG. 3B) according to the predicted light color, the assistance image being created according to an instruction of the driving assistance ECU 10.

In the example illustrated in FIG. 5A, in a case where the vehicle 300 is traveling in a section from a point immediately after the point P1 to the point P2, the arrival time T is shorter than the base arrival time Tb1. Accordingly, the driving assistance ECU 10 determines that the driving assistance ECU 10 is to prohibit the presentation of the driving assistance information. In a case where the driving assistance ECU 10 determines that the driving assistance ECU 10 is to prohibit the presentation of the driving assistance information, the display ECU 40 causes the display for assistance-display 41 to display the image (for example, the non-image illustrated in FIG. 3C) which is created according to an instruction of the driving assistance ECU 10 and in which the predicted light color cannot be recognized by the driver.

As a result, when the vehicle 300 is traveling in the assistance section R1 toward the nearest signalized intersection ahead, the presentation of the driving assistance information is to be performed or is to be prohibited as follows. That is, when the vehicle 300 is traveling in the first section that is a section from the route signal information acquisition point (P0) to a predetermined point (P1) positioned before the signalized intersection passing point (P2) by a predetermined distance, the presentation of the driving assistance information is performed (that is, an assistance image (the image G1 or the image G2) according to the predicted light color is displayed on the display for assistance-display 41).

When the vehicle 300 is traveling at a point immediately after the predetermined point (P1), the presentation of the driving assistance information is prohibited, and the display image on the display for assistance-display 41 is changed from the assistance image (the image G1 or the image G2) according to the predicted light color that has been displayed until the point P1, to an image (an image G3) in which the predicted light color cannot be recognized. Then, when the vehicle 300 is traveling in the second section that is a section from at least the predetermined point (P1) to the entrance of the corresponding signalized intersection, the presentation of the driving assistance information is prohibited (that is, an image (the image G3) in which the predicted light color cannot be recognized is displayed on the display for assistance-display 41).

Assistance Section R2

In a case where the vehicle 300 is traveling in an assistance section R2 after passing through the point P2 (in the case of n=2), the driving assistance ECU 10 calculates an assistance-section time T2. The assistance-section time T2 is the time to be taken when the vehicle 300 travels from the position of the vehicle 300 at the current time point to the nearest signalized intersection passing point ahead (P4) at the vehicle speed v (correlated vehicle speed) of the own vehicle at the current time point. In addition, the driving assistance ECU 10 determines a base arrival time Tb2, based on the relationship illustrated in FIG. 5B and the assistance-section time T2.

When the vehicle 300 is traveling in a section from a point immediately after the point P2 to the point P4 (the assistance section R2), the driving assistance ECU 10 repeatedly determines whether the arrival time T is shorter than the base arrival time Tb2 so as to determine whether the driving assistance ECU 10 is to perform the presentation of the driving assistance information. That is, the base arrival time Tb2 is used as a threshold for determining whether the presentation of the driving assistance information is to be performed.

In the example illustrated in FIG. 5A, when the vehicle 300 is traveling in a section from a point immediately after the point P2 to the point P3, the arrival time T is equal to or longer than the base arrival time Tb2. Accordingly, the driving assistance ECU 10 determines that the driving assistance ECU 10 is to perform the presentation of the driving assistance information. In a case where the driving assistance ECU 10 determines that the driving assistance ECU 10 is to perform the presentation of the driving assistance information, the display ECU 40 causes the display for assistance-display 41 to display an assistance image (for example, the image G1 illustrated in FIG. 3A or the image G2 illustrated in FIG. 3B) according to the predicted light color, the assistance image being created according to an instruction of the driving assistance ECU 10.

In the example illustrated in FIG. 5A, when the vehicle 300 is traveling in a section from a point immediately after the point P3 to the point P4, the arrival time T is shorter than the base arrival time Tb2. Accordingly, the driving assistance ECU 10 determines that the driving assistance ECU 10 is to prohibit the presentation of the driving assistance information. In a case where the driving assistance ECU 10 determines that the driving assistance ECU 10 is to prohibit the presentation of the driving assistance information, the display ECU 40 causes the display for assistance-display 41 to display the image (for example, the non-image G3 illustrated in FIG. 3C) which is created according to an instruction of the driving assistance ECU 10 and in which the predicted light color cannot be recognized by the driver.

As a result, when the vehicle 300 is traveling in the assistance section R2 toward the nearest signalized intersection ahead, the presentation of the driving assistance information is to be performed or is to be prohibited as follows. That is, when the vehicle 300 is traveling at a point immediately after the point P2, the presentation of the driving assistance information is performed, and the display image on the display for assistance-display 41 is changed from the image (the image G3) which has been displayed until the point P2 and in which the predicted light color cannot be recognized, to an assistance image (the image G1 or the image G2) according to the predicted light color.

When the vehicle 300 is traveling in the first section that is a section from the signalized intersection passing point (P2) to a predetermined point (P3) positioned before the signalized intersection passing point (P4) by a predetermined distance, the presentation of the driving assistance information is performed (that is, an assistance image (the image G1 or the image G2) according to the predicted light color is displayed on the display for assistance-display 41).

When the vehicle 300 is traveling at a point immediately after the predetermined point (P3), the presentation of the driving assistance information is prohibited, and the display image on the display for assistance-display 41 is changed from the assistance image (the image G1 or the image G2) according to the predicted light color that has been displayed until the point P3, to an image (an image G3) in which the predicted light color cannot be recognized. Then, when the vehicle 300 is traveling in the second section that is a section from at least the predetermined point (P3) to the entrance of the corresponding signalized intersection, the presentation of the driving assistance information is prohibited (that is, an image (the image G3) in which the predicted light color cannot be recognized is displayed on the display for assistance-display 41).

Assistance Section R3

In a case where the vehicle 300 is traveling in an assistance section R3 after passing through the point P4 (in the case of n=3), the driving assistance ECU 10 calculates an assistance-section time T3. The assistance-section time T3 is the time to be taken when the vehicle 300 travels from the position of the vehicle 300 at the current time point to the nearest signalized intersection passing point ahead (the point P6) at the vehicle speed v (correlated vehicle speed) of the own vehicle at the current time point. In addition, the driving assistance ECU 10 determines a base arrival time Tb3, based on the relationship illustrated in FIG. 5B and the assistance-section time T3.

In a case where the vehicle 300 is traveling in a section from a point immediately after the point P4 to the point P6 (the assistance section R3), the driving assistance ECU 10 repeatedly determines whether the arrival time T is shorter than the base arrival time Tb3 so as to determine whether the driving assistance ECU 10 is to perform the presentation of the driving assistance information. That is, the base arrival time Tb3 is used as a threshold for determining whether the driving assistance ECU 10 is to perform the presentation of the driving assistance information.

In the example illustrated in FIG. 5A, when the vehicle 300 is traveling in a section from a point immediately after the point P4 to the point P5, the arrival time T is equal to or longer than the base arrival time Tb3. Accordingly, the driving assistance ECU 10 determines that the driving assistance ECU 10 is to perform the presentation of the driving assistance information. In a case where the driving assistance ECU 10 determines that the driving assistance ECU 10 is to perform the presentation of the driving assistance information, the display ECU 40 causes the display for assistance-display 41 to display an assistance image (for example, the image G1 illustrated in FIG. 3A or the image G2 illustrated in FIG. 3B) according to the predicted light color, the assistance image being created according to an instruction of the driving assistance ECU 10.

In the example illustrated in FIG. 5A, in a case where the vehicle 300 is traveling in a section from a point immediately after the point P5 to the point P6, the arrival time T is shorter than the base arrival time Tb3. Accordingly, the driving assistance ECU 10 determines that the driving assistance ECU 10 is to prohibit the presentation of the driving assistance information. In a case where the driving assistance ECU 10 determines that the driving assistance ECU 10 is to prohibit the presentation of the driving assistance information, the display ECU 40 causes the display for assistance-display 41 to display the image (for example, the non-image G3 illustrated in FIG. 3C) which is created according to an instruction of the driving assistance ECU 10 and in which the predicted light color cannot be recognized by the driver.

As a result, when the vehicle 300 is traveling in the assistance section R3 toward the nearest signalized intersection ahead, the presentation of the driving assistance information is to be performed or is to be prohibited as follows. That is, when the vehicle 300 is traveling at a point immediately after the point P4, the presentation of the driving assistance information is performed, and the display image on the display for assistance-display 41 is changed from the image (the image G3) which has been displayed until the point P4 and in which the predicted light color cannot be recognized, to an assistance image (the image G1 or the image G2) according to the predicted light color.

When the vehicle 300 is traveling in the first section that is a section from the signalized intersection passing point (P4) to a predetermined point (P5) positioned before the signalized intersection passing point (P6) by a predetermined distance, the presentation of the driving assistance information is performed (that is, an assistance image (the image G1 or the image G2) according to the predicted light color is displayed on the display for assistance-display 41).

When the vehicle 300 is traveling at a point immediately after the predetermined point (P5), the presentation of the driving assistance information is prohibited, and the display image on the display for assistance-display 41 is changed from the assistance image (the image G1 or the image G2) according to the predicted light color that has been displayed until the point P5, to an image (an image G3) in which the predicted light color cannot be recognized. Then, when the vehicle 300 is traveling in the second section that is a section from at least the predetermined point (P5) to the entrance of the corresponding signalized intersection, the presentation of the driving assistance information is prohibited (that is, an image (the image G3) in which the predicted light color cannot be recognized is displayed on the display for assistance-display 41).

Specific Operation

Figure 4:
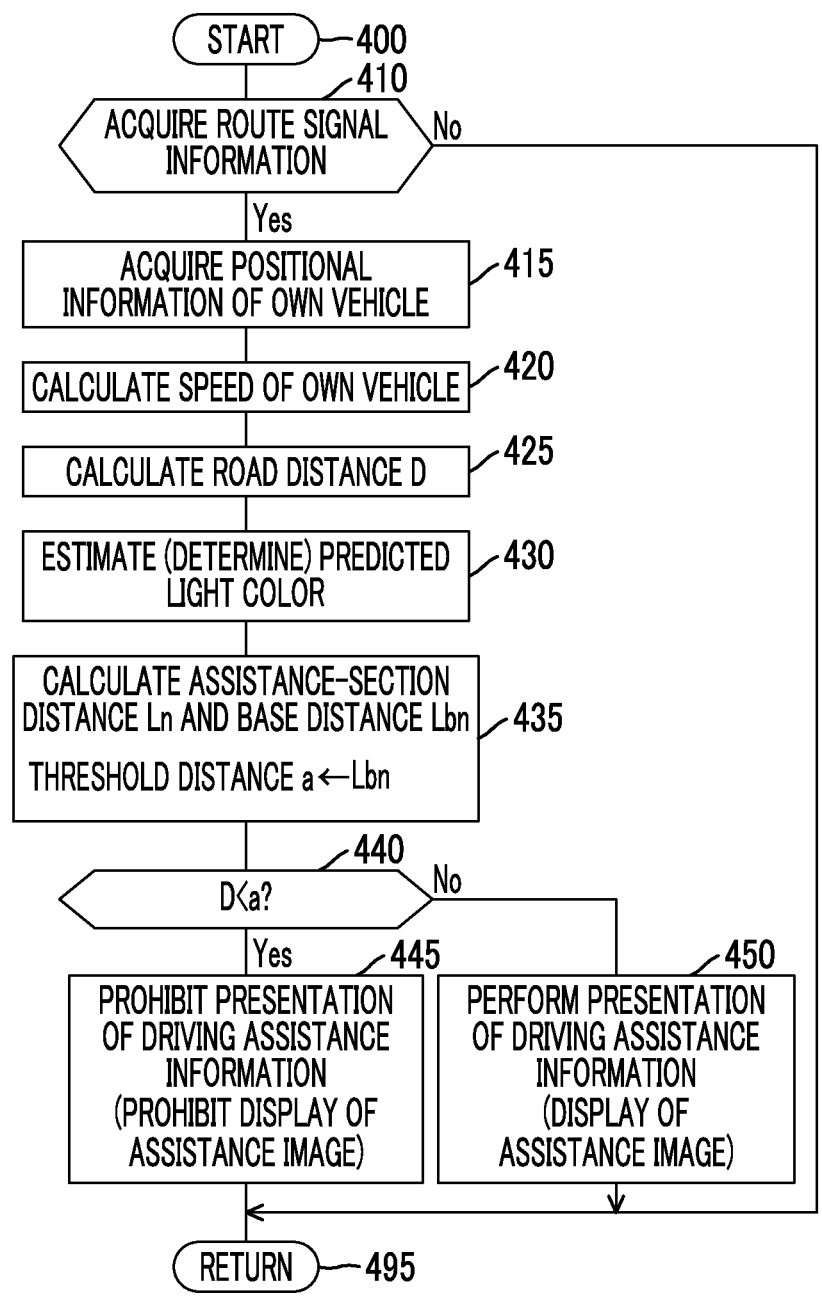
FIG. 4 is a flowchart illustrating a routine executed by a CPU of a driving assistance ECU.

Next, the specific operation of the second driving assistance device will be described. Whenever a predetermined time elapses, the CPU of the second driving assistance device is configured to execute the routine illustrated in the flowchart in FIG. 6. In FIG. 6, the steps for performing the same processes as the steps that have been described using FIG. 4 are assigned with the reference numerals given to such steps of FIG. 4, and the description for the steps will not be provided.

The CPU starts the process from step 600 at a predetermined timing, and executes the processes of step 410 to step 420.

Then, the CPU proceeds to step 610, calculates a distance (the road distance D) from the position of the own vehicle 300 at the current time point to the nearest signalized intersection passing point ahead, and calculates, as the arrival time T, a time by dividing the road distance D by the vehicle speed v (correlated vehicle speed) of the own vehicle at the current time point.

Then, the CPU executes the process of step 430 to estimate light colors of traffic signals S1 to Sn that are the first traffic signal to n-th traffic signal from the own vehicle 300 (that is, determines the predicted light color), and determines an assistance image according to the predicted light color of the nearest signalized intersection ahead from the position of the own vehicle, among n signalized intersections. The CPU proceeds to step 620, calculates the assistance-section time Tn, determines the base arrival time Tbn, based on the assistance-section time Tn, and sets the determined base arrival time Tbn as a threshold time h.

Then, the CPU proceeds to step 630, and determines whether the arrival time T is shorter than the threshold time h. In a case where the arrival time T is equal to or longer than the threshold time h, the CPU determines "No" in step 630 (that is, determines that the presentation of the driving assistance information is to be performed), proceeds to step 450, and transmits an instruction to the display ECU 40 so that the presentation of the driving assistance information (that is, the display of "the assistance image according to the predicted light color of the nearest signalized intersection ahead" determined in step 430) is performed. Then, the CPU proceeds to step 695 to temporarily finish the routine.

In contrast, in a case where the arrival time T is shorter than the threshold time h, the CPU determines "Yes" in step 630 (that is, determines that the presentation of the driving assistance information is prohibited), proceeds to step 445, and prohibits the presentation of the driving assistance information. Then, the CPU proceeds to step 695 to temporarily finish the routine.

As described above, with the second driving assistance device, actions and effects described below can be obtained. That is, in a case where the arrival time T to be taken when the vehicle 300 travels by the road distance D to the signalized intersection passing point of the nearest signalized intersection ahead, at the correlated vehicle speed is shorter than the threshold time h, the display of an assistance image including an image indicating information regarding the predicted light color of the traffic signal installed at the corresponding signalized intersection (that is, the presentation of the driving assistance information to the driver) is not performed.

In this manner, when the vehicle 300 is traveling in the assistance section Rn that is the presentation target of the driving assistance information regarding the corresponding signalized intersection, toward the corresponding signalized intersection, in the second section that is a section from at least a point positioned before the corresponding signalized intersection by a predetermined distance to the entrance of the corresponding signalized intersection, the display of the assistance image including an image indicating the information regarding the predicted light color of the traffic signal installed at the corresponding signalized intersection (that is, the presentation of driving assistance information to the driver) is not performed.

Accordingly, before the driver of the vehicle 300 enters the nearest signalized intersection ahead, it is possible to urge the driver to visually check the light color of the traffic signal installed at the corresponding signalized intersection, and thus to cause the vehicle 300 to smoothly pass the signalized intersection.

The threshold time h is determined to be increased continuously or stepwise as the time (the assistance-section time Tn) to be taken when the vehicle travels in each assistance section Rn that is the presentation target of the driving assistance information regarding the nearest signalized intersection ahead, at the correlated vehicle speed is increased (refer to FIG. 5B). Accordingly, even when the assistance-section time Tn varies, the presentation of the driving assistance information to the driver is stopped at an appropriate timing. As a result, it is possible to cause the driver to be conscious of visually checking the light color of the traffic signal at an appropriate timing.

Modification Example

Embodiments of the disclosure have specifically been described, but the disclosure is not limited to the embodiments, and various modification examples based on the technical idea of the disclosure can be adopted.

Figure 7A:
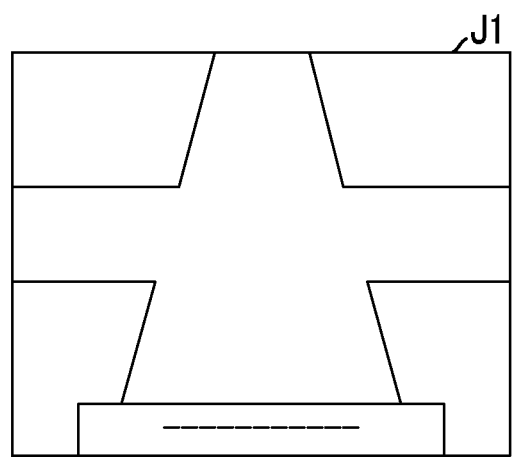
FIG. 7A is a schematic diagram illustrating an example of a display image.
Figure 7B:
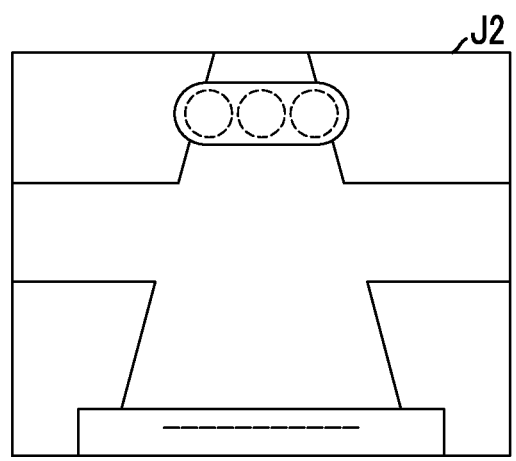
FIG. 7B is a schematic diagram illustrating an example of a display image.

In the above embodiments, in a case where the presentation of the driving assistance information is prohibited, the driving assistance ECU 10 may cause the display for assistance-display 41 to display a display image in which the predicted light color cannot be recognized by the driver, such as an image J1 illustrated in FIG. 7A or an image J2 illustrated in FIG. 7B.

In the above embodiments, a state in which the presentation of the driving assistance information is prohibited is changed to a state in which the presentation of the driving assistance information is performed, at a position of the stop line on the exit side of the signalized intersection which is the signalized intersection passing point. However, a state in which the presentation of the driving assistance information is prohibited may be changed to a state in which the presentation of the driving assistance information is performed, when a predetermined time elapses or when the vehicle travels by a predetermined distance after the vehicle 300 has arrived at the entrance of the signalized intersection.

In this case, in the above embodiments, the signalized intersection passing point is set to a position of the stop line on the exit side of the signalized intersection. However, the signalized intersection passing point may be set to a position selected within a range of the signalized intersection. For example, the signalized intersection passing point may be set to a position of the stop line on the entrance side of the signalized intersection, and the signalized intersection passing point may be set to a position at the center of the signalized intersection. In the above embodiments, a state in which the presentation of the driving assistance information is prohibited may be changed to a state in which the presentation of the driving assistance information is performed, when a predetermined time elapses or when the vehicle travels by a predetermined distance after the vehicle has passed the signalized intersection passing point.

What is claimed is:

1. A driving assistance device comprising:
a wireless communication unit configured to acquire route signal information, through wireless communication, from a roadside communicator that is installed on a road on which a vehicle travels, the route signal information including a position of one signalized intersection or positions of a plurality of signalized intersections present in front of the vehicle in a traveling direction, a color of light of a traffic signal installed at the signalized intersection, and the seconds remaining until the color of the light changes;
a display unit configured to display an assistance image including an image indicating information regarding a predicted light color of the nearest signalized intersection ahead where the vehicle is scheduled to enter, the predicted light color being a color of light of the traffic signal that is predicted as a color when the vehicle is entering the signalized intersection, by using vehicle information including the position of the vehicle and a vehicle speed of the vehicle, and the route signal information; and
a controller configured to estimate the predicted light color and to perform presentation of driving assistance information regarding the nearest signalized intersection ahead to a driver of the vehicle by causing the display unit to display the assistance image,
wherein in a case where the vehicle is traveling in an assistance section that is a presentation target of the driving assistance information regarding the nearest signalized intersection ahead, toward the nearest signalized intersection ahead, the controller performs presentation of the driving assistance information when the vehicle is traveling in a first section that is a section from a point where the route signal information is acquired or from a signalized intersection passing point, to a predetermined point positioned before the nearest signalized intersection ahead by a predetermined distance, and prohibits the presentation of the driving assistance information when the vehicle is traveling in a second section that is a section from at least the predetermined point to an entrance of the nearest signalized intersection ahead.

2. The driving assistance device according to claim 1,
wherein the controller is configured to calculate a road distance from a current point of the vehicle to the nearest signalized intersection ahead by using the vehicle information and the route signal information,
wherein the controller is configured to determine whether the road distance is less than a threshold distance that is equal to the predetermined distance,
wherein the controller is configured to determine that the vehicle is traveling in the first section when the road distance is equal to or longer than the threshold distance, and to perform the presentation of the driving assistance information, and
wherein the controller is configured to determine that the vehicle is traveling in the second section when the road distance is shorter than the threshold distance, and to prohibit the presentation of the driving assistance information.

3. The driving assistance device according to claim 2,
wherein the controller is configured to, when the nearest signalized intersection ahead is a first signalized intersection from the point where the route signal information is acquired, calculate a distance of a section from the point where the route signal information is acquired to the nearest signalized intersection ahead, as a distance of the assistance section,
wherein the controller is configured to, when the nearest signalized intersection ahead is a second or subsequent signalized intersection from the point where the route signal information is acquired, calculate a distance of a section from the signalized intersection that is adjacent to the nearest signalized intersection ahead and is in a direction opposite to a traveling direction of the vehicle, to the nearest signalized intersection ahead, as a distance of the assistance section, and
wherein the controller is configured to determine the threshold distance such that the threshold distance corresponding to the assistance section is increased continuously or stepwise as the calculated distance of the assistance section is increased.

4. The driving assistance device according to claim 1,
wherein the controller is configured to calculate a road distance from a current point of the vehicle to the nearest signalized intersection ahead by using the vehicle information and the route signal information and calculate an arrival time by dividing the road distance by a correlated vehicle speed that is correlated to the vehicle speed of the vehicle,
wherein the controller is configured to determine whether the arrival time is shorter than a threshold time that is a time obtained by dividing the predetermined distance by the correlated vehicle speed,
wherein the controller is configured to determine that the vehicle is traveling in the first section when the arrival time is equal to or longer than the threshold time, and to perform the presentation of the driving assistance information, and
wherein the controller is configured to determine that the vehicle is traveling in the second section when the arrival time is shorter than the threshold time, and to prohibit the presentation of the driving assistance information.

5. The driving assistance device according to claim 4,
wherein the controller is configured to, when the nearest signalized intersection ahead is a first signalized intersection from the point where the route signal information is acquired, calculate a distance of a section from the point where the route signal information is acquired to the nearest signalized intersection ahead, as a distance of the assistance section and calculate a time to be taken when the vehicle travels in the assistance section at the correlated vehicle speed by dividing the calculated distance by the correlated vehicle speed,
wherein the controller is configured to, when the nearest signalized intersection ahead is a second or subsequent signalized intersection from the point where the route signal information is acquired, calculate a distance of a section from a signalized intersection that is adjacent to the nearest signalized intersection ahead and is in a direction opposite to a traveling direction of the vehicle, to the nearest signalized intersection ahead, as a distance of the assistance section, and calculate a time to be taken when the vehicle travels in the assistance section at the correlated vehicle speed by dividing the calculated distance by the correlated vehicle speed, and
wherein the controller is configured to determine the threshold time such that the threshold time corresponding to the assistance section is increased continuously or stepwise as the calculated time to be taken of the assistance section is increased.

6. The driving assistance device according to claim 1, wherein the controller is configured to, when the presentation of the driving assistance information is prohibited, cause the display unit to display an image in which the predicted light color cannot be recognized by the driver.

7. The driving assistance device according to claim 1, wherein the controller is configured to change a state in which the presentation of the driving assistance information is prohibited to a state in which the presentation of the driving assistance information is performed, when a predetermined time elapses or when the vehicle travels by a predetermined distance after the vehicle has arrived at the entrance of the nearest signalized intersection.

* * * * *